(12) United States Patent
Zhang (10) Patent No.: US 11,947,246 B1
(45) Date of Patent: Apr. 2, 2024

(54) SHOOTING DEVICE WITH SLIDING RAILS

(71) Applicant: Shenzhen Kemaituo Technology Co., Ltd., Shenzhen (CN)

(72) Inventor: Liqiong Zhang, Shenzhen (CN)

(73) Assignee: Shenzhen Kemaituo Technology Co., Ltd., Shenzhen (CN)

( * ) Notice: Subject to any disclaimer, the term of this patent is extended or adjusted under 35 U.S.C. 154(b) by 0 days.

(21) Appl. No.: 18/519,657

(22) Filed: Nov. 27, 2023

(51) Int. Cl.
*G03B 15/16* (2021.01)
*G03B 15/04* (2021.01)
*G03B 17/56* (2021.01)
*H04N 23/53* (2023.01)

(52) U.S. Cl.
CPC .......... *G03B 15/16* (2013.01); *G03B 15/041* (2013.01); *G03B 17/561* (2013.01); *G03B 17/565* (2013.01); *H04N 23/531* (2023.01)

(58) Field of Classification Search
CPC .... G03B 15/16; G03B 15/041; G03B 17/561; G03B 17/565; H04N 23/531
See application file for complete search history.

(56) References Cited

U.S. PATENT DOCUMENTS

| | | | | |
|---|---|---|---|---|
| 7,394,977 B2 * | 7/2008 | Park | ........................ | G03B 35/00 396/428 |
| 7,840,371 B2 * | 11/2010 | Gaspardo | ................ | G06T 7/579 702/151 |
| 7,931,380 B2 * | 4/2011 | Williams | ............... | G03B 15/02 362/357 |
| 11,415,867 B1 * | 8/2022 | Cicerone | .............. | F16M 11/123 |
| 2002/0085219 A1 * | 7/2002 | Ramamoorthy | ....... | H04N 19/61 358/1.9 |
| 2003/0030636 A1 * | 2/2003 | Yamaoka | ............. | H04N 5/2627 348/E5.042 |
| 2005/0117696 A1 * | 6/2005 | Suzuki | ................... | A61B 6/548 378/19 |
| 2011/0176147 A1 * | 7/2011 | Marcil | ................... | G01B 11/25 356/602 |
| 2012/0177350 A1 * | 7/2012 | Jancourtz | ............... | F16M 11/08 396/5 |

(Continued)

FOREIGN PATENT DOCUMENTS

| CN | 106323090 A | 1/2017 |
|---|---|---|
| CN | 206837463 U | 1/2018 |
| CN | 211425214 U | 9/2020 |

*Primary Examiner* — Timothy J Henn
(74) *Attorney, Agent, or Firm* — Nitin Kaushik (57) ABSTRACT

The application provides a shooting device with slide rails, comprising a support component, a tabletop arranged on the support component, a display screen arranged on one side of the tabletop, and a shooting rotational station arranged on the other side of the tabletop; a fill light arranged between the shooting rotational station and the tabletop; a slide rail component used for loading the shooting rotational station and the fill light, and a rotating component installed on the support component; the rotating component is rotatably installed on the support component, the display screen is arranged on one end of the rotating component, the slide rail component is arranged on the other end of the rotating component, the shooting rotational station and the fill light are slidably installed on the slide rail component, and the slide rail component is flippable relative to the rotating component.

6 Claims, 9 Drawing Sheets

(56) References Cited

U.S. PATENT DOCUMENTS

| | | | | |
|---|---|---|---|---|
| 2015/0085067 A1* | 3/2015 | Mueller | ............... | F16M 11/046 |
| | | | | 348/37 |
| 2017/0345209 A1* | 11/2017 | Simari | ................ | G06V 10/235 |
| 2019/0227419 A1* | 7/2019 | McNelley | ............ | H04N 9/3182 |
| 2022/0091480 A1* | 3/2022 | House | .................... | G03B 15/10 |
| 2022/0254019 A1* | 8/2022 | Connor | ................ | G06T 7/0012 |
| 2022/0382502 A1* | 12/2022 | Zink | .................... | G06F 3/1446 |
| 2023/0336870 A1* | 10/2023 | Geissler | .............. | H04N 23/675 |

\* cited by examiner

SHOOTING DEVICE WITH SLIDING RAILS

CROSS-REFERENCE TO RELATED APPLICATIONS

The application claims the priority of a Chinese patent application CN 2023228029880 with a filing date on Oct. 16, 2023, and its entire content is incorporated by reference into the application.

TECHNICAL FIELD

The application relates to a technical field of shooting, in particular to a shooting device with slide rails.

BACKGROUND

Currently, although there are many mobile phones, tablet PC, and other photography devices on the market which are used for shooting, most devices cannot truly achieve panoramic shooting. Moreover, direct manual operation for panoramic photography may result in imperfect panoramic images due to factors such as shaking and inability to maintain a horizontal baseline.

SUMMARY

The application provides a shooting device with slide rails, comprising:
a support component, a tabletop arranged on the support component, a display screen arranged on one side of the tabletop, and a shooting rotational station arranged on the other side of the tabletop; a fill light arranged between the shooting rotational station and the tabletop; a slide rail component used for loading the shooting rotational station and the fill light, and a rotating component installed on the support component;
wherein, the rotating component is rotatably installed on the support component, the display screen is arranged on one end of the rotating component, the slide rail component is arranged on the other end of the rotating component, the shooting rotational station and the fill light are slidably installed on the slide rail component, and the slide rail component is flippable relative to the rotating component.

As another embodiment of the application, the support component comprises a base and a support rod installed on the base; the tabletop is installed at the top of the support rod, and the bottom of the base is provided with a bearing surface, a support section arranged on the bearing surface, a bottom fixing frame installed within the support section, and several foots arranged on the edges of the bearing surface.

As another embodiment of the application, the rotating component comprises a bearing installed on the support rod, a rotating frame fixing member installed on the bearing, and a first rotating frame installed on the rotating frame fixing member; one end of the first rotating frame is inserted with a second rotating frame, which is equipped with a support seat and a support frame; the display screen is installed on the support frame, and the other end of the first rotating frame is provided with a bending section, the bending section is externally connected with a rotating frame connector, which is connected with the slide rail component.

As another embodiment of the application, the first rotating frame and the second rotating frame are locked by fixing bolt, and a counterweight block is arranged on the support seat.

As another embodiment of the application, the slide rail component comprises a slide rail body, a concave slide rail groove arranged on an inner edge of the slide rail body, and a rotational station fixing seat and a fill light fixing seat respectively installed in the concave slide rail groove; the shooting rotational station and the fill light are respectively installed on the rotational station fixing seat and the fill light fixing seat, and the slide rail body is connected with the bending section by the rotating frame connector.

As another embodiment of the application, the rotating frame connector includes a fixing seat frame, sliding blocks arranged on both sides of the fixing seat frame, a support block installed inside the fixing seat frame, and a rotating connection part installed on the support block; the sliding block is installed in a concave sliding rail groove, and the rotating connection part is externally connected with a steering support shaft, which is installed on the bending section.

It should be understood that the general description above and the detailed description in the following are only illustrative and explanatory, and do not limit the application.

BRIEF DESCRIPTION OF DRAWINGS

The drawings herein are incorporated into and form part of the specification to show embodiments that conform to the application and are used together with the specification to explain the rationale of the application. At the same time, these drawings and descriptions are not intended in any way to limit the scope of the idea of the application, but rather to illustrate the concept of the application for persons skilled in the art by reference to specific embodiments.

In the figures:
11—support component; 12—rotating component; 13—slide rail component; 14—shooting rotational station; 15—fill light; 16—display screen; 17—tabletop; 21—base; 22—support rod; 23—bottom fixing frame; 24—bearing surface; 25—foot cup; 26—support section; 31—protection block; 32—bearing; 33—rotating frame fixing member; 34—first rotating frame; 35—second rotating frame; 36—fixing bolt; 37—support seat; 38—support frame; 39—counterweight block; 41—bending section; 42—rotating frame connector; 51—slide rail body; 52—rotational station fixing seat; 53—fill light fixing seat; 54—concave slide rail groove; 61—fixing seat frame; 62—sliding block;

63—support block; 64—rotating connection part; 65—steering support shaft.

DETAILED DESCRIPTION OF THE EMBODIMENTS

The technical scheme in the embodiments of the application will be clearly and completely described below in combination with the drawings attached to the embodiments of the application, the examples of which are shown in the drawings. Where the description below relates to drawings, the same numbers in different drawings represent the same or similar element, unless otherwise indicated.

It is clear that the embodiments described are only one part of the embodiments of the application and not the entirety of the embodiments. Based on the embodiments in the application, all other embodiments obtained by ordinary skilled persons in the field without creative labor are within the scope of protection in the application.

The shooting rotational station in the current technology generally includes: rotational disk, equipped with an equipment groove and an operating groove. A shooting rotational station using a motor-driven is rotated 360 degrees for shooting mainly using an electric drive mode. However, this kind of the adjustability of the shooting rotational station itself has a limited adjustability, and can only be adjusted within the coordinate range of the plane of the shooting rotational station, and has a limited adjustment freedom, and cannot achieve an adjustment effect of three-dimensional shooting.

The following is a detailed description of the embodiments of the application in combination with specific embodiments.

Figure 1:
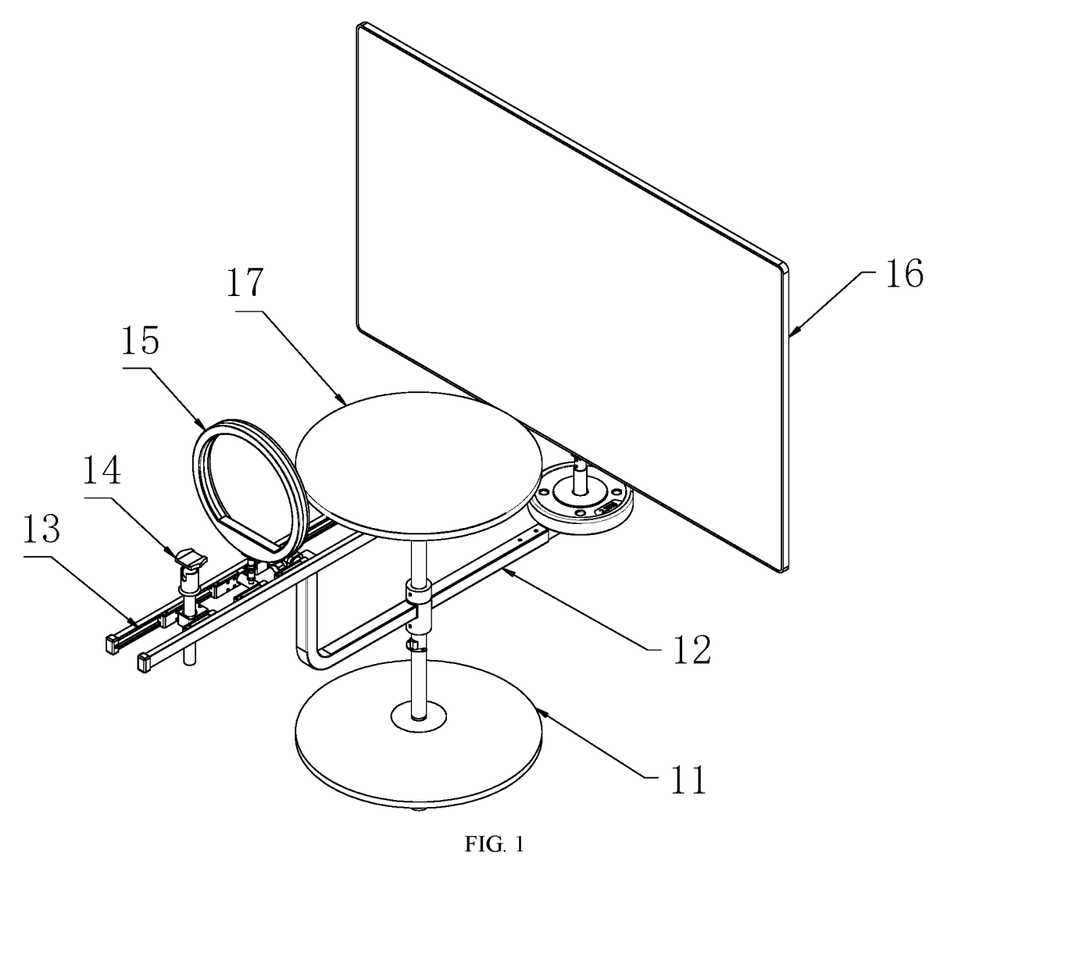
FIG. 1 is a schematic diagram of a overall structure of the shooting device with slide rails of one embodiment of the application.

In one embodiment, referred to FIG. 1, a shooting device with slide rails is provided, comprising a support component 11, a tabletop 17 arranged on the support component 11, a display screen 16 arranged on one side of the tabletop 17, and a shooting rotational station 14 arranged on the other side of the tabletop 17; a fill light 15 arranged between the shooting rotational station 14 and the tabletop 17; a slide rail component 13 used for loading the shooting rotational station 14 and the fill light 15, and a rotating component 12 arranged on the support component 11.

The rotating component 12 is rotatably arranged on the support component 11, the display screen 16 is arranged on one end of the rotating component 12, the slide rail component 13 is arranged on the other end of the rotating component 12, the shooting rotational station 14 and the fill light 15 are arranged on the slide rail component 13, the slide rail component 13 is flippable relative to the rotating component 12.

This embodiment is used for multi-angle and multi-azimuth shooting of the product. The support component 11 is supported on the ground, and the object to be photographed is placed on the tabletop 17. The display screen 16 is used for background processing, and the display screen 16 can be replaced by a green screen. The shooting rotational station 14 is a carrier of a camera for installing the camera and other shooting tools. A fill light 15 is used to fill light of the shooting environment. The slide rail component 13 is used to support the shooting rotational station 14 and the fill light 15, and the shooting rotational station 14 and the fill light 15 can be moved along the slide rail component 13 to adjust the shooting distance. The slide rail component 13 and the display screen 16 are installed on the rotating component 12, and the rotating component 12 is rotatably arranged on the support component 11, so that the rotating component 12 can be adjusted at any angle within 360°. At the same time, the slide rail component 13 can be turned over relative to the rotating component 12, and then the working angle of the shooting rotational station 14 and the fill light 15 can be adjusted, to achieve the effect of three-dimensional panoramic shooting. This device is applied to product shooting, and can be shot with a multi-angle, a multi-direction mode and easy to adjust the distance.

Figure 2:
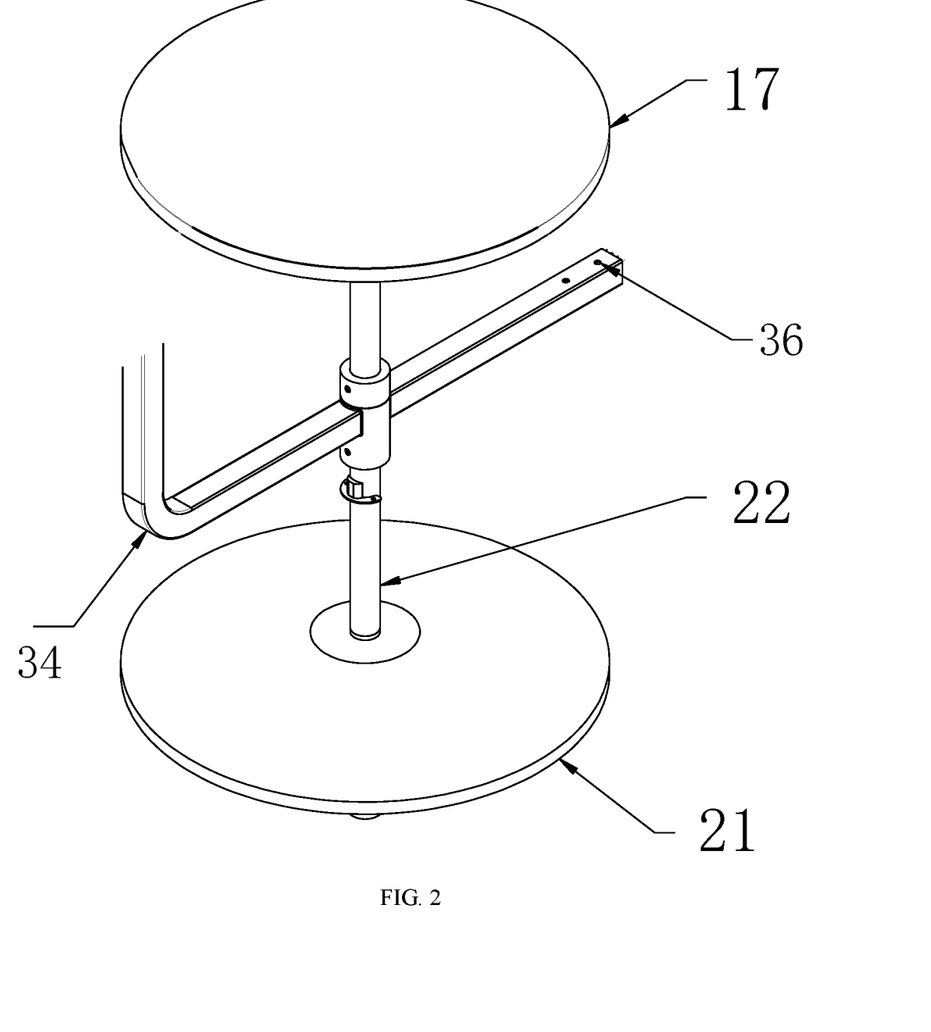
FIG. 2 is a structural diagram of the support component of one embodiment of the application.
Figure 3:
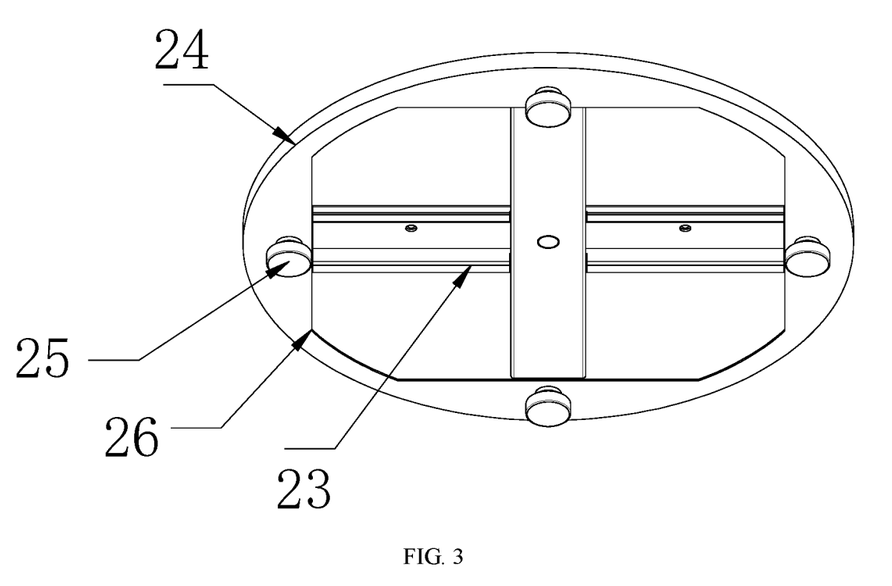
FIG. 3 is a structural diagram of the base of one embodiment of the application.

In one embodiment, referred to FIGS. 2 and 3, the embodiment is designed as follows for the structure of the support component 11:

the support component 11 comprises a base 21 and a support rod 22 arranged on the base 21; the tabletop 17 is arranged on the top of the support rod 22, and the bottom of the base 21 is provided with a bearing surface 24, a support section 26 arranged on the bearing surface 24, a bottom fixing frame 23 installed within the support section 26, and a plurality of foots 25 arranged on the edge of the bearing surface 24. In this embodiment, a support component 11 is used to support the tabletop 17. The bottom of the base 21 is provided with a bearing surface 24, and a bottom fixing frame is provided on the bearing surface 24 to ensure the stability of the bottom. The foot cup 25 is used to support the ground.

Figure 4:
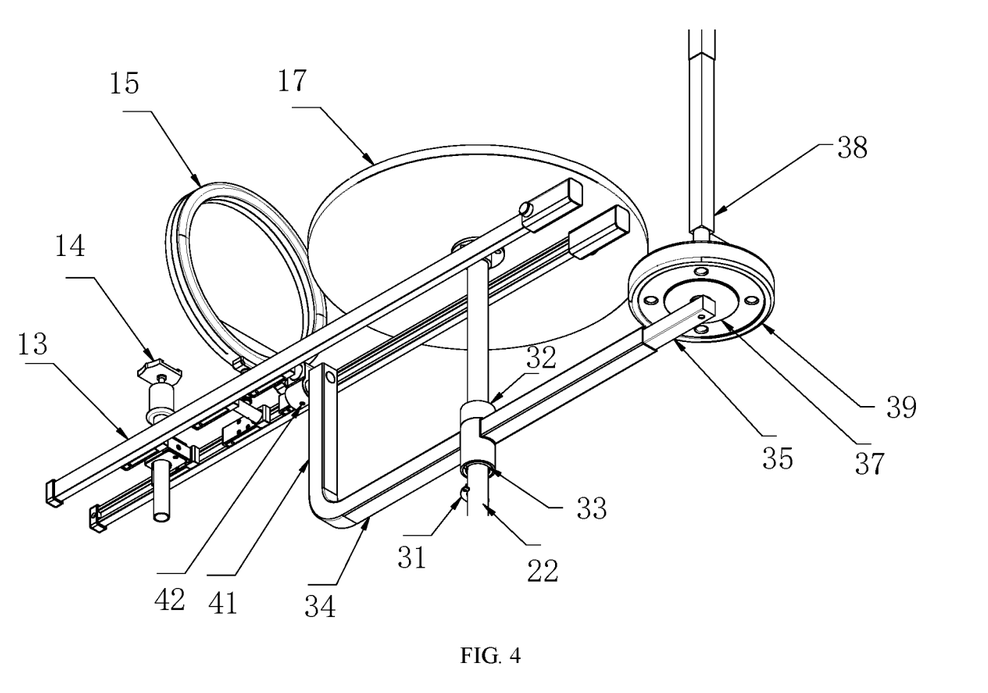
FIG. 4 is a structural diagram of the rotating component of one embodiment of the application.

In one embodiment, referred to FIGS. 2, 3, and 4, the embodiment is designed as follows for the structure of the support component 11:

the rotating component 12 comprises a bearing 32 arranged on a support rod 22, a rotating frame fixing member 33 arranged on the bearing 32, and a first rotating frame 34 arranged on the rotating frame fixing member 33; a protection block 31 also provided on the support rod 22 to prevent scratching of the support rod 22 when fixing the rotating frame by twisting the screws. One end of the first rotating frame 34 is inserted with a second rotating frame 35, and a support seat 37 is arranged on the second rotating frame 35, and a support frame 38 is arranged on the support seat 37; the first rotating frame 34 and the second rotating frame 35 are locked by fixing bolt 36, and the second rotating frame 35 is arranged on the first rotating frame 34, and the transverse distance can be adjusted by a groove on the second rotating frame 35 and the fixing bolt 36. The display screen 16 is installed on the support frame 38, the other end of the first rotating frame 34 is provided with a bending section 41, the bending section 41 is connected with a rotating frame connector 42, the rotating frame connector 42 is connected with the slide rail component 13, the support seat 37 is provided with a counterweight block 39. The whole product can be balanced by the transverse distance adjustment of the counterweight block and the second rotating frame.

Figure 5:
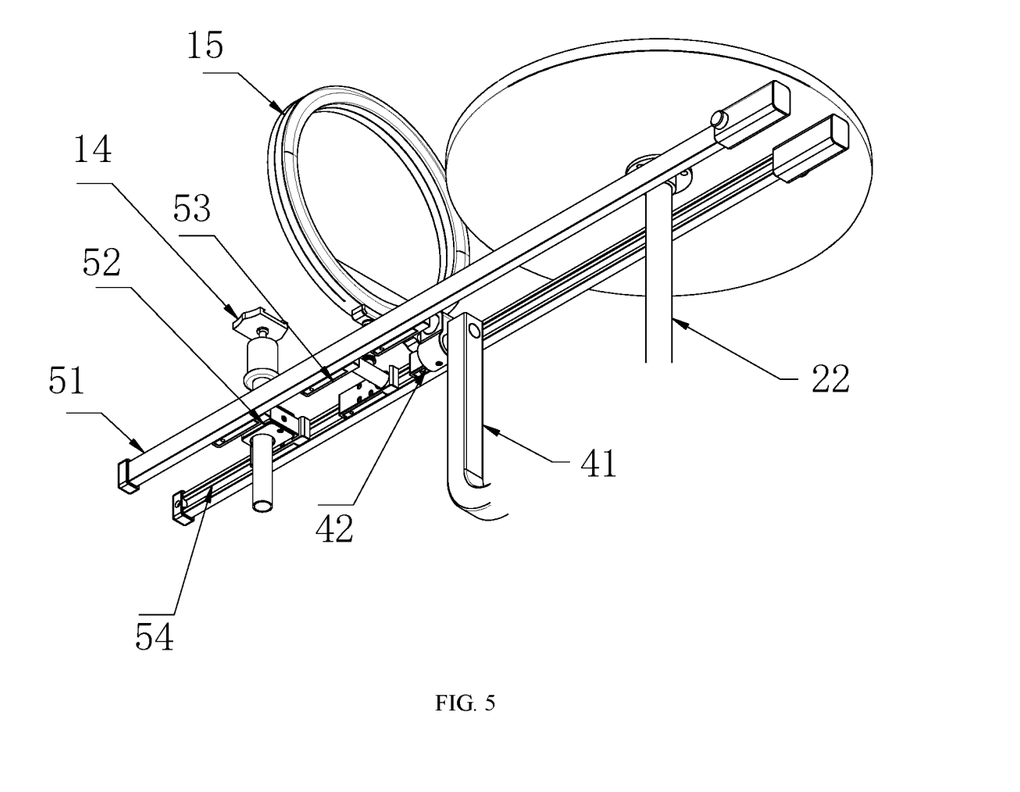
FIG. 5 is a structural diagram of the slide rail component of one embodiment of the application.
Figure 6:
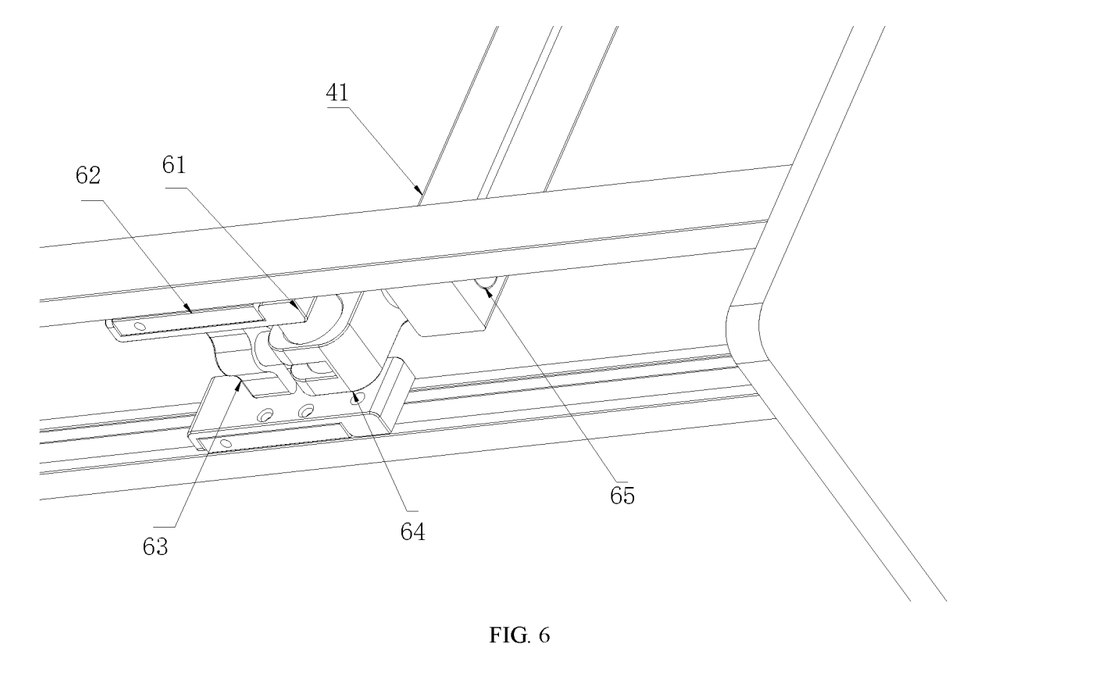
FIG. 6 is a structural diagram of the rotating frame connector of one embodiment of the application.

In one embodiment, referred to FIGS. 5 and 6, the embodiment is designed as follows for the structure of the support component 11:

the slide rail component 13 comprises a slide body 51, a concave slide rail groove 54 arranged on the inner edge of the slide body 51, and a rotational station fixing seat 52 and a fill light fixing seat 53 respectively installed in the concave slide rail groove 54; the shooting rotational station 14 and the fill light 15 are respectively installed on the rotational station fixing seat 52 and the fill light fixing seat 53, and the slide rail body 51 is connected with the bending section 41 by the rotating frame connector 42. The rotating frame connector 42 comprises a fixing seat frame 61, a sliding block 62 arranged on both sides of the fixing seat frame 61, a support block 63 installed inside the fixing seat frame 61, and a rotating connection part 64 installed on the support block 63; the sliding block 62 is installed in a concave slide rail groove 54, the rotating connection part 64 is externally connected with a steering support shaft 65, and the steering support shaft 65 is installed on the bending section 41.

The shooting rotational station 14 and the fill light 15 are independently installed on the slide rail component 13, with an adjustable sliding manner. The slide rail component 13 is arranged on the bending section 41 of the first rotating frame 34 with the rotating frame connector 42 as the fulcrum, and can be horizontally displaced with respect to the first rotating frame 34 with the rotating frame connector 42 as the fulcrum, and vertically turned with respect to the first rotating frame 34, and can be rotated with respect to the support rod 22 by the cooperation of the first rotating frame 34, so as to achieve the effect of three-dimensional panoramic shooting.

Figure 7:
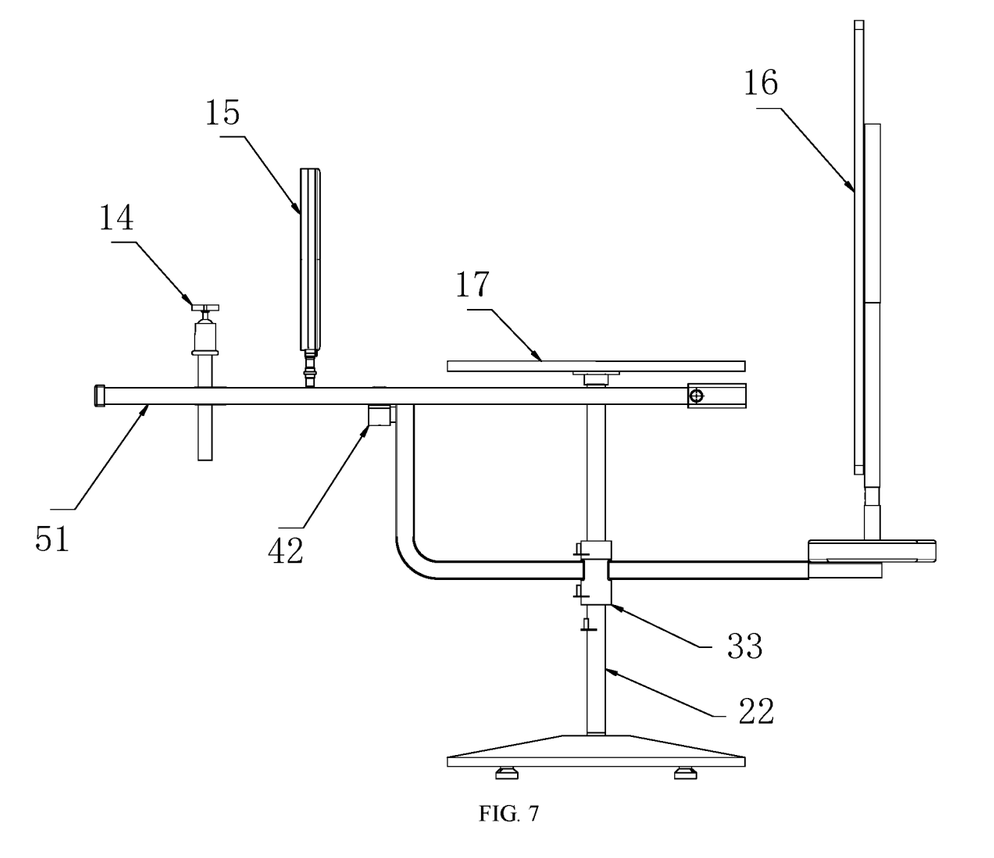
FIG. 7 is a structural diagram of the slide rail component in a horizontal direction in the application.
Figure 8:
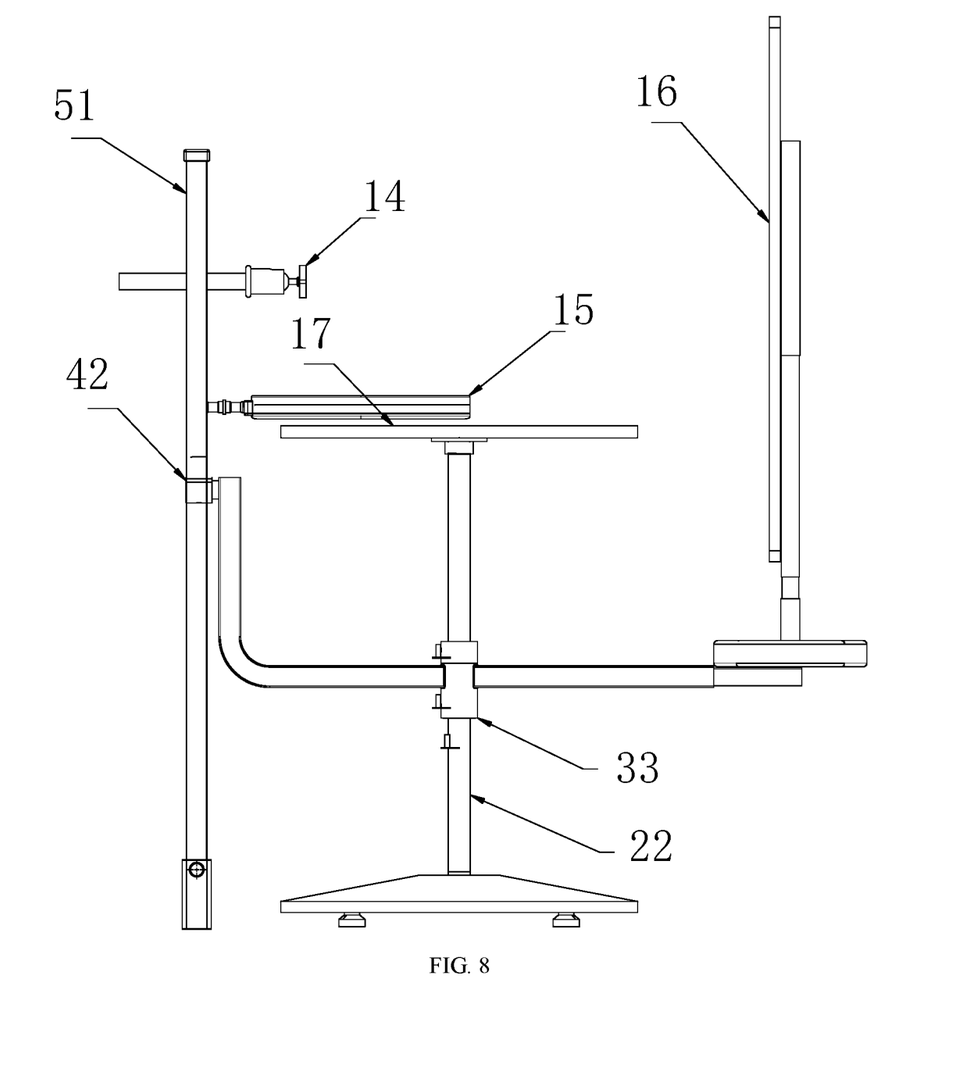
FIG. 8 is a structural diagram of the slide rail component in a vertical direction in the application.
Figure 9:
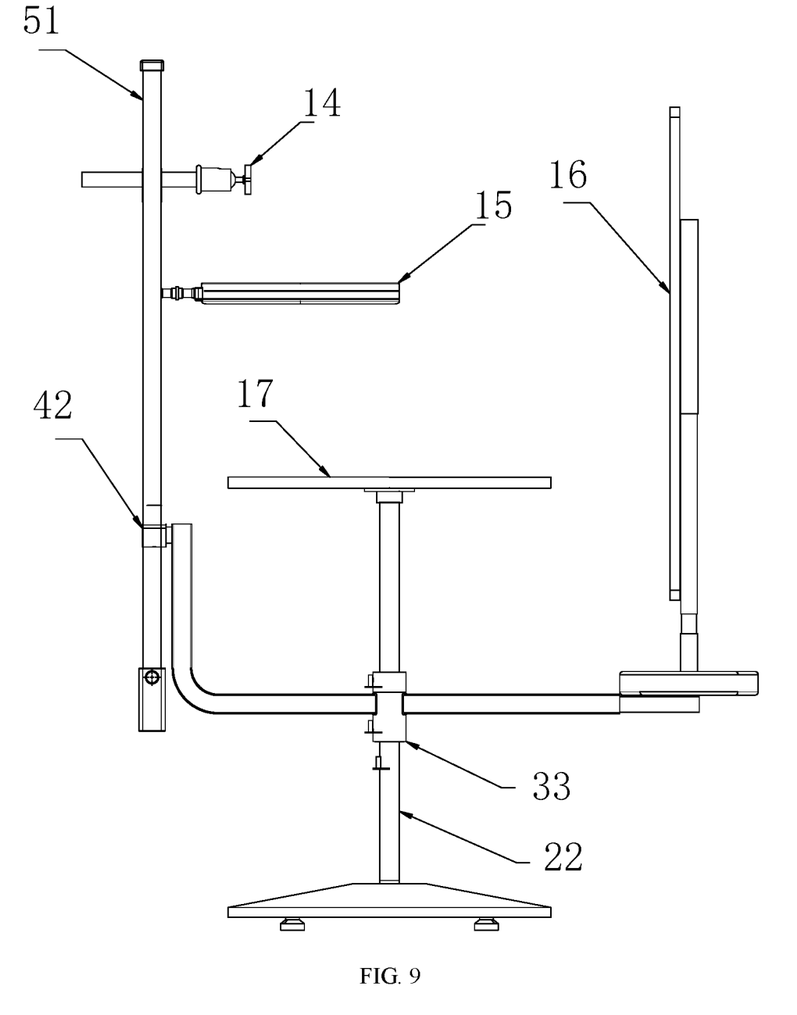
FIG. 9 is a structure diagram of the slide rail component in a vertical direction and moved upward in the application.

Based on the above embodiments and combined with FIGS. 7, 8 and 9, the overall embodiments of a shooting device with slide rails described in this embodiment are described in detail:

the fill light 15, the shooting rotational station 14 and other shooting equipment are fixed on the sliding block fixing parts such as the rotational station fixing seat 52 and the fill light fixing seat 53 by screws, and a sliding block is installed on the sliding block fixing part. The sliding block is provided with three dislocated pulleys above and below the sliding block, which can easily slide by the concave slide rail groove 54 and the chromeplating rod in the groove. There is a groove in the slide block, and a fixed module with thread is arranged in the groove. A thumb screw passes through both sides of the slide block and the fixed module in it. With thumb screw tightening, the fixed module will move to one side until the slide block is fixed on the slide rail, so as to realize easy adjustment of shooting distance and fixing of the shooting equipment. A built-in protection module is installed in the rotational station fixing seat 52. The protection module adheres to a round tube of the rotational station to fix the shooting rotational station 14 by the thumb screw at the lower end of the rotational station fixing seat 52, and effectively protects the shooting rotational station 14. The counterweight block 39 improves the balance of both ends, and the entire slide rail and shooting equipment can easily slide and adjust the shooting distance by the slide block and slide rail.

The slide rail is fixed on the first rotating frame 34 by the rotating frame connector 42, and a bearing 32 is equipped in the front of and behind the rotating frame connector 42, making the shooting angle be adjusted in the front, rear, left and right directions, greatly increasing the practicality of the product and the user's operability. The rotating frame is arranged on the support rod 22, and the part connected with the support rod 22 is equipped with a built-in bearing 32, making the shooting auxiliary equipment be rotated within 360° back and forth. The support rod 22 fixed parts are installed on two ends of the connecting rod, which is convenient to adjust the height of the rotating frame and fix the rotating frame part. The second rotating frame 35 is arranged on the first rotating frame 34. The transverse distance adjustment can be realized by the groove on the second rotating frame 35 and thumb screw, and a counterweight plate on the second rotating frame 35 is set to adjust the balance of the device. One end of the second rotating frame 35 is fixed on the support frame 38 of the green screen or display screen 16, on which the green screen or display screen 16 is fixed. The rotating center point added on the left and right ends can ensure that the green screen or display screen 16 and the camera are at different ends of the rotation center to facilitate the post-processing of the image after shooting. The fastener of the support rod 22 is built with a protection module, which can protect the appearance of the support rod 22 when the fastener of the support rod 22 is fixed on the support rod 22 by thumb screw.

In another embodiment, the slide rail component 13 can be replaced by two parallel carbon fiber round tubes that can be pulled and pushed. The two carbon fiber round tubes are provided with a rotational station connector and a fill light connector which can be slidably adjusted. The shooting rotational station 14 is installed on the rotational station connector by the rotational station fixing member, and the fill light 15 is installed on the fill light connector by the fill light fixing member. The rotational station connector and the fill light connector are also provided with a thumb screw for fastening. In this embodiment, the shooting distance of the rotational station 14 and the fill light 15 can be adjusted by flipping the rotational station connector and the fill light connector along the two carbon fiber round tubes. After the adjustment, the thumb screws on the corresponding parts can be tightened and fixed. It should be noted that the carbon fiber material is hard and light-weighted. By setting two carbon fiber round tubes, the shooting device is very light and it is easy to adjust.

The beneficial effects of the application compared to prior art are:

the embodiment is used for multi-angle and multi-azimuth shooting of the product. The slide rail component is used to support the shooting rotational station and the fill light, and the shooting rotational station and the fill light can be moved along the slide rail component to adjust the shooting spacing. The whole slide rail and the accessories on it can move as a whole when the slide rail moves on the rotating connector, further adjusting the shooting distance. The slide rail component and the display screen are installed on the rotating component, and the rotating component is arranged on the support component, so that the shooting angle can be adjusted. At the same time, the slide rail component can be turned over relative to the rotating component, and then the shooting rotational station and the fill light can be adjusted. This device can be used in product shooting, which can realize multi-angle, multi-direction and easily adjustable distance shooting.

It is obvious to those skilled in the art that the application is not limited to the details of the above-mentioned exemplary embodiments and can be realized in other concrete forms without departing from the spirit or essential features of the application. Therefore, the embodiments should be regarded in all respects as exemplary and non-restrictive, and the scope of the application is defined by the attached claims and not by the above description, and is therefore intended to encompass in the application all changes that fall within the meaning and scope of the equivalents of the claims.

Besides, it should be understood that although the specification is described in terms of embodiments, not each embodiment contains only one independent technical scheme, and that the specification is described in this manner only for the sake of clarity, the specification should be taken as a whole by those skilled in the art, and the technical scheme in the various embodiments may be appropriately combined to form other embodiments that are understandable to those skilled in the art.

What is claimed is:

1. A shooting device with slide rails, comprising:
a support component (11), a tabletop (17) arranged on the support component (11), a display screen (16) arranged on one side of the tabletop (17), and a shooting rotational station (14) arranged on the other side of the tabletop (17), a fill light (15) arranged between the shooting rotational station (14) and the tabletop (17), a slide rail component (13) used for loading the shooting rotational station (14) and the fill light (15), and a rotating component (12) installed on the support component (11);
wherein, the rotating component (12) is rotatably arranged on the support component (11), the display screen (16) is arranged on one end of the rotating component (12), the slide rail component (13) is arranged on the other end of the rotating component (12), the shooting rotational station (14) and the fill light (15) are slidably arranged on the slide rail component (13), and the slide rail component (13) is flippable relative to the rotating component (12).

2. The shooting device with slide rails of claim 1, wherein the support component (11) comprises a base (21) and a support rod (22) installed on the base (21); the tabletop (17) is installed at the top of the support rod (22), and the bottom of the base (21) is provided with a bearing surface (24), a support section (26) arranged on the bearing surface (24), a bottom fixing frame (23) installed within the support section (26), and several foots (25) arranged on the edges of the bearing surface (24).

3. The shooting device with slide rails of claim 2, wherein the rotating component (12) comprises a bearing (32) installed on the support rod (22), a rotating frame fixing member (33) installed on the bearing (32), and a first rotating frame (34) installed on the rotating frame fixing member (33); one end of the first rotating frame (34) is inserted with a second rotating frame (35), which is equipped with a support seat (37) and a support frame (38) installed on the support seat (37); the display screen (16) is installed on the support frame (38), and the other end of the first rotating frame (34) is provided with a bending section (41), the bending section (41) is externally connected with a rotating frame connector (42), which is connected with the slide rail component (13).

4. The shooting device with slide rails of claim 3, wherein the first rotating frame (34) and the second rotating frame (35) are locked by a fixing bolt (36), and a counterweight block (39) is arranged on the support seat (37).

5. The shooting device with slide rails of claim 3, wherein the slide rail component (13) comprises a slide rail body (51), a concave slide rail groove (54) arranged on an inner edge of the slide rail body (51), and a rotational station fixing seat (52) and a fill light fixing seat (53) respectively installed in the concave slide rail groove (54); the shooting rotational station (14) and the fill light (15) are respectively installed on the rotational station fixing seat (52) and the fill light fixing seat (53), and the slide rail body (51) is connected with the bending section (41) by the rotating frame connector (42).

6. The shooting device with slide rails of claim 5, wherein the rotating frame connector (42) comprises a fixing seat frame (61), sliding blocks (62) arranged on both sides of the fixing seat frame (61), a support block (63) installed inside the fixing seat frame (61), and a rotating connection part (64) installed on the support block (63); the sliding block (62) is installed in the concave slide rail groove (54), and the rotating connection part (64) is externally connected with a steering support shaft (65), which is installed on the bending section (41).

* * * * *